Patented Apr. 11, 1939

2,153,707

UNITED STATES PATENT OFFICE 2,153,707

AMINO-ACID DERIVATIVES AND THEIR MANUFACTURE

Fritz Becherer and Martin Iselin, Riehen, near Basel, and Jakob Bindler, Basel, Switzerland, assignors to the firm J. R. Geigy S. A., Basel, Switzerland No Drawing. Application December 11, 1936, Serial No. 115,440. In Germany December 23, 1935

19 Claims. (Cl. 260—562)

According to this invention new compounds of technical value are made by causing a compound of the type

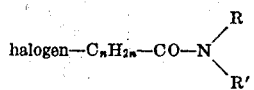

containing easily exchangeable halogen, $n=1, 2, 3$, wherein R represents a saturated or unsaturated alkyl radical of high molecular weight containing more than 6 carbon atoms and R' represents cycloalkyl, aralkyl or aryl, to react with a primary, secondary or tertiary amine of aliphatic, araliphatic, hydroaromatic or aromatic nature. In the case of secondary or tertiary amines these may be simple or mixed substituted compounds and in all cases alkyl radicals present may contain hydroxyl and/or halogen. In so far as the new products of the reaction are secondary or tertiary bases they can be further treated with any of the customary alkylating or a-alkylating agents, which may be unsubstituted or may be substituted by halogen and/or by hydroxyl. The amines obtained by the invention can also be converted into definite salts of organic or inorganic acids.

The halogen fatty acid amides used as parent materials can be made by causing a halogen fatty acid or the corresponding halogen fatty acid chloride to react with a secondary amine of the type

in which R represents the alkyl radical corresponding with a higher alcohol obtainable by reduction or hydrogenation of naturally occurring fats, oils, resins, naphthenic acids and so on, and R' means cycloalkyl, aralkyl or aryl. These amines are obtainable by known methods, for example by alkylation of primary cycloalkyl-, aralkyl- or arylamines or vice-versa.

The reaction between the particular halogen fatty acid amides above defined and amines may be conducted according to known methods, whereby by the use of a primary, secondary or tertiary amine the corresponding secondary, tertiary or quaternary amino group takes the place of the halogen.

If there is selected for the reaction an amine which leads to a secondary or tertiary aminoacid derivative, it can subsequently be further alkylated. For this alkylation there may be used the customary alkylating agents, for example mineral acid esters of saturated or unsaturated alcohols, such as alkyl, aralkyl- or alkylenehalides, halogen hydrins, dialkylsulphates and the like; or the product may be combined with a sulphonic acid ester or the like.

In the form of bases the new compounds, with exception of the quaternary ammonium compounds, are mostly oils which can easily be distilled in a vacuum and are insoluble or sparingly soluble in water. They can be converted into substances soluble in water by methods commonly used in the case of ammonia derivatives. They form salts with inorganic or organic acids, for example hydrochlorides, sulphates, phosphates, silicofluorates, formates, monochloracetates, oxalates, citrates and tartrates.

The new amino-acid derivatives are useful for various purposes. By suitable choice of the components used in their synthesis it is possible to combine particular properties in the same molecule, or to render some particular action particularly prominent. By reason of the fact that already in the halogen fatty acid amide molecule there is present in the amide radical besides an alkyl of high molecular weight a further radical of the cycloalkyl-, aralkyl- or aryl-series the latter being available for substitution in various manners, the possibilities for influencing the properties of the final products are remarkably numerous. Substitution by one or more halogen atoms in the aralkyl or aryl radical for example changes the substantivity or toxicity, whereas substitution by hydroxyl or by nitrogen again gives rise to other effects. There can be obtained in this manner for example textile assistants, such as excellent wetting agents, agents for improving the fastness of direct dyeings towards water, agents for drawing off naphthol AS-dyeings, agents for imparting a matt appearance to regenerated cellulose or softening agents for textiles.

They may also be valuable as agents for combatting animal pests, such as agents for protecting plants, or as agents for protection against moths. They may also have interesting strong bactericidal or fungicidal properties.

The following examples illustrate the invention:—

Example 1

Dodecylaniline serving as parent material is chloracetylated and the acid amide so obtained is worked up in known manner.

300 grams of chloroacetododecylanilide are added by drops to 600 grams of an aqueous solution of dimethylamine of 20.4 per cent strength. At first the reaction mixture scarcely becomes warm; only after the whole quantity has been added the temperature rises to about 40–45° C. The reaction mixture is heated in the course of 3–4 hours to 80–90° C. and then stirred at this temperature for 20 hours longer. The final product is still alkaline towards phenolphthalein and should dissolve clearly in acids. It is poured into 500 ccm. of water and the oil which precipitates is separated. The dimethylaminoacetic acid N-dodecylanilide thus prepared is mixed with 1 litre of water and the whole is rendered acid to Congo by means of hydrochloric acid. The strongly foaming solution is freed from small quantities of by-products by extraction with ether, the aqueous solution is made alkaline with sodium carbonate and the product is separated from the aqueous layer, dried and distilled in a vacuum. It boils at 100–240° C. under 1 millimetre pressure.

The bases so obtainable may be converted into salts or quarternary compounds in a manner which will now be described taking as example the above described dimethylamino-acetic acid N-dodecylanilide.

a. 34.6 grams of dimethylamino-acetic acid N-dodecylanilide made as above described are mixed with a solution of 12.6 grams of oxalic acid in 200 ccm. of water and the whole is evaporated to dryness. The oxalate so obtained dissolves in water to a clear solution and crystallises in beautiful white crystals.

b. The quantity of the anilide specified under a is mixed with 10.6 grams of sulphuric acid of 93.3 per cent strength which have been diluted with 200 ccm. of water and the whole is evaporated to dryness. The sulphate so obtained is soluble in water to a clear solution and has soap-like properties.

These products are excellent wetting agents and are also useful for improving the fastness of direct dyeings towards water.

Other acids may be used instead of oxalic or sulphuric acid, for example hydrochloric acid, phosphoric acid, formic acid, chloracetic acid, etc.; the salts obtained have the properties above indicated.

c. 34.6 grams of dimethylamino-acetic acid N-dodecylanilide are mixed with 12 grams of allylbromide. The temperature rises to 70° C., and the reaction mass becomes viscous and after heating for 3 hours at 60° C. it has become completely soluble in water. The quarternary compound thus obtained is dissolved in water and the solution is extracted, if necessary, with ether to remove the last traces of allylbromide and then evaporated to dryness.

d. The same quantity of anilide as specified in c is heated with 13.7 grams of butylbromide for 4 hours on a water bath at 80–90° C. and the product is worked up as indicated in c.

The quarternary compound so obtained is a good wetting agent and a good moth proofing agent.

e. 29.4 grams of dimethylamino-acetic acid N-dodecylanilide and 6.85 grams of glycolchlorhydrin or the corresponding quantity of glycerine-α-chlorhydrin are heated together for 2–3 hours at 120–125° C. and the product is worked up as indicated in c. There is obtained an addition compound which dissolves in water to clear solutions having a strong bactericidal action and an excellent wetting capacity and which are useful for improving the fastness of direct dyeings towards water. In particular this product is useful for protecting animal fibres against moths.

f. 34.6 grams of the anilide and 15 grams of orthochlorbenzylchloride are heated together for 24 hours on a water bath at 80–90° C. After working up there is obtained a product which is a good wetting agent and a good agent for protecting animal fibres against moths.

g. 21.5 grams of the anilide and 15 grams of toluene sulphonic acid amylester are heated together for 6 hours at 130–140° C. and the product is worked up as in c. The new compound is completely soluble in cold water to a clear solution.

h. 21.5 grams of the anilide and 13.5 grams of chloromethylenesalicylic acid are dissolved in 50 grams of benzene and the solution is heated in a reflux apparatus for 6 hours at 70° C. The benzene is then distilled in a vacuum. The residue is a viscous mass which dissolves in water to a clear solution.

*Example 2*

34 grams of chloracetododecylanilide and 35 grams of diamylamine are heated together for 24 hours at 130° C. during which operation the hydrochloride separates out. When the reaction is finished the diamylamino-acetic acid N-dodecylanilide thus formed is taken up in ether and the whole is separated from the diamylamine hydrochloride by filtering. The ether is evaporated and the base which remains is mixed with 1 litre of water and sulphuric acid is added until the reaction is acid to Congo. The clear aqueous solution is separated from a small quantity of insoluble matter and then mixed with an excess of sodium carbonate, whereby diamylamino-acetic acid N-dodecylanilide is precipitated. It is sepaarted, dried and distilled in a vacuum. It boils at 140–285° C. under 2 millimetres pressure.

From this product there can be obtained according to the variations given in Example 1, similar products having excellent properties. The base may be converted into salts as described in a or b, or into quarternary compounds as described in c to h, whereby products soluble in water are obtained.

i. 11.5 grams of the base obtained according to Example 2 and 3.3 grams of dimethylsulphate are heated for 3–4 hours at 130–140° C. By working up in the manner above described there is obtained a product which dissolves completely in water to a clear solution.

*Example 3*

194 grams of chloracetododecylanilide and 102 grams of piperidine are dissolved in 500 grams of benzene and the solution is allowed to stand overnight at ordinary temperature. It is then filtered from the precipitated piperidinehydrochloride and the filtrate is distilled in a vacuum to remove the benzene and small quantities of piperidine. The residue is piperidinoacetic acid N-dodecylanilide; it is a dark oil which dissolves completely in aqueous acids to clear solutions.

Like the anilides described in Examples 1 and 2 the anilide obtained as described in this example may be used in solution in an organic solvent for various purposes, for example for moth proofing, for combatting plant-pests and so on, or it may be converted into new products by formation of salts or addition compounds.

k. 38.6 grams of piperidinoacetic acid N-dodecylanilide and 12.6 grams of benzyl chloride are heated together on a water bath at 90° C. for 24 hours. The quaternary compound so obtained is a brown viscous mass which is clearly soluble in water.

Instead of the amines used in Examples 1–3 for condensation with chlorocetododecylanilide or similar substituted chloracetoanilides, like dimethylamine, diamylamine or piperidine, there may also be used other secondary amines or even primary amines. As examples there may be named: monomethyl-, ethyl-, butyl-, amyl-, benzyl-, ethanol-, amine-, γ-chloro-β-oxy- and β,γ-dihydroxypropylamine, cyclohexylamine, ethylenediamine and asym. diethyl- ethylenediamine, diethyl- diethanolamine and so on.

Example 4

37 grams of bromacetododecylanilide and 37 grams of trimethylamine in an alcoholic solution of 33 per cent. strength are heated together with 200 grams of ethyl alcohol for 5 hours in an autoclave at 130–140° C. The alcohol and the excess of trimethylamine are then distilled and the residue is dried for a short time in a vacuum. There are obtained 49 grams of a brown waxy mass which is clearly soluble in water.

Instead of bromacetododecylanilide there may be used the corresponding compounds derived from oleyl-, cetyl- and stearyl-alcohol and so on. There are obtained quarternary compounds having similar properties.

Other tertiary bases may be used instead of trimethylamine, for example triethyl-, triamyl-, triethanolamine, pyridine bases, nicotine and so on.

For preparing the alkylaniline serving as parent material in the Examples 1–4 there may be used instead of the technical dodecyl alcohol or a mineral acid ester thereof, any other desired mixture of alcohols which is obtainable from natural fats and waxes viz: spermaceti, spermoil, cotton seed oil etc. by reduction or hydrogenation. There may likewise be used a mineral acid ester of isolated individual higher alcohols, such as cetyl-, ceryl-, stearyl- or oleylalcohol.

Instead of dodecylaniline there are also suitable other secondary dodecylamines, for example those containing substituted aromatic radicals or similarly substituted amines such as cyclohexylamine, benzyldodecylamine, naphthenaniline and so on.

Instead of the chloracetic acid derivatives used in the above example there may be used the corresponding derivatives of chloropropionic acid, chlorobutyric acid, and so on. The resulting products have in general the same or very similar properties.

What we claim is:—

1. A process for preparing new amino acid derivatives, which consists in causing a compound of the type

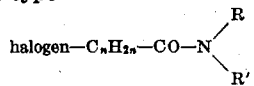

containing easily exchangeable halogen, $n=1, 2, 3$, (in which R represents a radical selected from the group consisting of saturated and unsaturated alkyl radicals of high molecular weight containing more than 6 carbon atoms and R' represents a radical selected from the group consisting of cycloalkyl, aralkyl and aryl) to react with an amine selected from the group consisting of primary, secondary and tertiary aliphatic, araliphatic, hydroaromatic and aromatic amines, including both simple and mixed substituted secondary and tertiary amines, the aliphatic substituents of these amines being selected from the group consisting of alkyl, hydroxyalkyl, halogenalkyl and halogenhydroxyalkyl radicals.

2. A process for preparing new amino-acid derivatives, which consists in causing a compound of the type

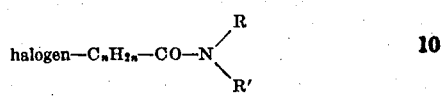

containing easily exchangeable halogen, $n=1, 2, 3$, (in which R represents a radical selected from the group consisting of saturated and unsaturated alkyl radicals of high molecular weight containing more than 6 carbon atoms and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and converting the product of the reaction into a salt.

3. A process for preparing new amino-acid derivatives, which consists in causing a compound of the type

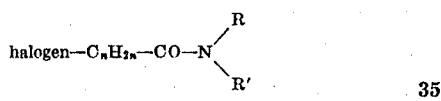

containing easily exchangeable halogen, $n=1, 2, 3$, (in which R represents a radical selected from the group consisting of saturated and unsaturated alkyl radicals of high molecular weight containing more than 6 carbon atoms and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and causing the product to react with a reagent selected from the group consisting of alkylating and aralkylating agents including those substituted in an aliphatic radical by at least one of the groups halogen and hydroxyl.

4. A process for preparing new amino-acid derivatives, which consists in causing a compound of the type

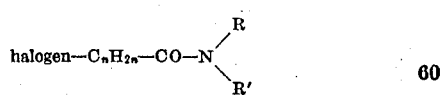

containing easily exchangeable halogen, $n=1, 2, 3$, (in which R represents a radical selected from the group consisting of saturated and unsaturated alkyl radicals of high molecular weight resulting from the alcohols of hydrogenated natural fats, oils, waxes, resins and naphthenic acids, and R' represents a radical selected from the group consisting of cycloalkyl, aralkyl and aryl) to react with an amine selected from the group consisting of primary, secondary and tertiary aliphatic, araliphatic, hydroaromatic and aromatic amines, including both simple and mixed substituted secondary and tertiary amines, the aliphatic substituents of these amines being selected from the group consisting of alkyl, hydroxyalkyl, halogenalkyl and halogenhydroxyalkyl radicals.

5. A process for preparing new amino-acid derivatives, which consists in causing a compound of the type

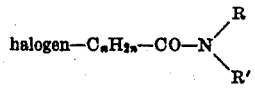

containing easily exchangeable halogen, $n=1, 2, 3$, (in which R represents a radical selected from the group consisting of saturated and unsaturated alkyl radicals of high molecular weight resulting from the alcohols of hydrogenated natural fats, oils, waxes, resins and naphthenic acids, and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and converting the product of the reaction into a salt.

6. A process for preparing new amino-acid derivatives, which consists in causing a compound of the type

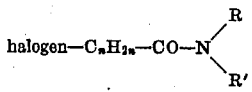

containing easily exchangeable halogen, $n=1, 2, 3$, (in which R represents a radical selected from the group consisting of saturated and unsaturated alkyl radicals of high molecular weight resulting from the alcohols of hydrogenated natural fats, oils, waxes, resins and naphthenic acids, and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and causing the product to react with a reagent selected from the group consisting of alkylating and aralkylating agents including those substituted in an aliphatic radical by at least one of the groups halogen and hydroxyl.

7. A process for preparing new amino-acid derivatives, which consists in causing a compound of the type

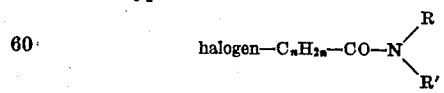

containing easily exchangeable halogen, $n=1, 2, 3$, (in which R represents a radical selected from the group consisting of saturated and unsaturated alkyl radicals of high molecular weight resulting from the alcohols of hydrogenated spermaceti, comprising mainly alkyl radicals from $C_{16}$ to $C_{18}$, and R' represents a radical selected from the group consisting of cycloalkyl, aralkyl and aryl) to react with an amine selected from the group consisting of primary, secondary and tertiary aliphatic, araliphatic, hydroaromatic and aromatic amines, including both simple and mixed substituted secondary and tertiary amines, the aliphatic substituents of these amines being selected from the group consisting of alkyl, hydroxyalkyl, halogenalkyl and halogenhydroxyalkyl radicals.

8. A process for preparing new amino-acid derivatives, which consists in causing a compound of the type

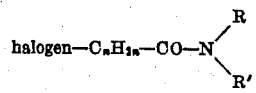

containing easily exchangeable halogen, $n=1, 2, 3$, (in which R represents a radical selected from the group consisting of saturated and unsaturated alkyl radicals of high molecular weight resulting from the alcohols of hydrogenated spermaceti, comprising mainly alkyl-radicals from $C_{16}$ to $C_{18}$, and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and converting the product of the reaction into a salt.

9. A process for preparing new amino-acid derivatives, which consists in causing a compound of the type

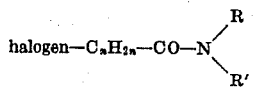

containing easily exchangeable halogen, $n=1, 2, 3$, (in which R represents a radical selected from the group consisting of saturated and unsaturated alkyl radicals of high molecular weight resulting from the alcohols of hydrogenated spermaceti, comprising mainly alkyl radicals from $C_{16}$ to $C_{18}$, and R' represents a radical selected from the group consisting of cycloalkyl, aralkyl and aryl) to react with an amine selected from the group consisting of primary and secondary aliphatic, araliphatic, hydroaromatic and aromatic amines, including both simple and mixed substituted secondary amines, the aliphatic substituents of these amines being selected from the group consisting of alkyl, hydroxyalkyl, halogenalkyl and halogenhydroxyalkyl radicals, and causing the product to react with a reagent selected from the group consisting of alkylating and aralkylating agents including those substituted in an aliphatic radical by at least one of the groups halogen and hydroxyl.

10. A process for preparing new amino-acid derivatives, which consists in causing a compound of the type

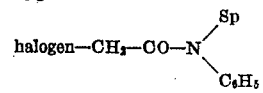

containing easily exchangeable halogen (in which Sp represents the high molecular alkyl radical derived from the alcohols of hydrogenated spermaceti comprising mainly alkyl radicals from $C_{16}$ to $C_{18}$) to react with an alkylated aliphatic amine, including both simple and mixed substituted secondary amines, the aliphatic substituents of these amines being selected from the group consisting of alkyl, hydroxyalkyl, halogenalkyl and halogenhydroxyalkyl radicals, and causing the product to react with a reagent selected from the group consisting of alkylating and aralkylating agents including those substituted in an aliphatic radical by at least one of the groups halogen and hydroxyl.

11. A process for preparing new amino-acid derivatives, which consists in causing a compound of the type

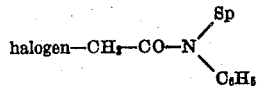

containing easily exchangeable halogen (in which Sp represents the high molecular alkyl radical derived from the alcohols of hydrogenated spermaceti comprising mainly alkyl radicals from $C_{16}$ to $C_{18}$) to react with a methylated amine, including both simple and mixed substituted secondary amines, the aliphatic substituents of these amines being selected from the group consisting of alkyl, hydroxyalkyl, halogenalkyl and halogenhydroxyalkyl radicals, and causing the product to react with a reagent selected from the group consisting of alkylating and aralkylating agents including those substituted in an aliphatic radical by at least one of the groups halogen and hydroxyl.

12. A process for preparing a new amino-acid amide, which consists in causing chloraceto-higher alkyl-anilide (higher alkyl meaning the high molecular alkyl radicals derived from the alcohols of hydrogenated spermaceti, comprising mainly alkyl radicals from $C_{16}$ to $C_{18}$) to react with dimethylamine and alkylating with dimethylsulphate.

13. A process for preparing a new amino-acid amide, which consists in causing chloraceto-higher alkyl-anilide (higher alkyl meaning the high molecular alkyl radicals derived from the alcohols of hydrogenated spermaceti, comprising mainly alkyl radicals from $C_{16}$ to $C_{18}$) to react with dimethylamine and benzylating with benzylchloride.

14. A process for preparing a new amino-acid amide, which consists in causing chloraceto-higher alkyl-anilide (higher alkyl meaning the high molecular alkyl radicals derived from the alcohols of hydrogenated spermaceti, comprising mainly alkyl radicals from $C_{16}$ to $C_{18}$) to react with dimethylamine and alkylating with glycol-chlorhydrin.

15. As new products the amino-acid amides of the general formula:

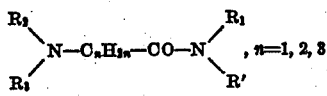

in which $R_1$ represents a radical selected from the group consisting of saturated and unsaturated alkyl radicals of high molecular weight containing more than 6 carbon atoms, $R'$ represents a radical selected from the group consisting of cycloalkyl, aralkyl and aryl, $R_2$ represents a radical selected from the group consisting of hydrogen, aliphatic, araliphatic, hydroaromatic and aromatic radicals, and $R_3$ represents a radical selected from the group consisting of aliphatic, araliphatic, hydroaromatic and aromatic radicals, and the salts and quaternary ammonium compounds of the said amino-acid amides.

16. As new products the amino-acid amides of the general formula

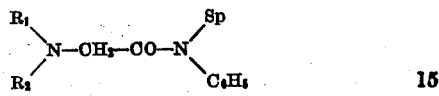

in which Sp represents the high molecular alkyl radical derived from the alcohols of hydrogenated spermaceti comprising mainly alkyl radicals from $C_{16}$ to $C_{18}$ and $R_1$ and $R_2$ alkyl radicals, and the salts and quaternary ammonium compounds of the said amino-acidamides.

17. As new product trimethylamino-acetic acid higher alkyl anilide-methoxysulphate of the probable formula

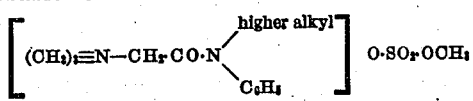

higher alkyl meaning the high molecular alkyl radicals derived from the alcohols of hydrogenated spermaceti, comprising mainly alkyl radicals from $C_{16}$ to $C_{18}$.

18. As new product benzyldimethylamino acetic acid higher alkyl anilide-chloride of the probable formula

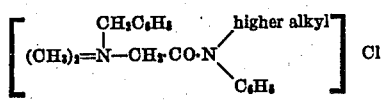

higher alkyl meaning the high molecular alkyl radicals derived from the alcohols of hydrogenated spermaceti, comprising mainly alkyl radicals from $C_{16}$ to $C_{18}$.

19. As new product β-hydroxyethyldimethyl-amino acetic acid higher alkyl anilidechloride of the probable formula

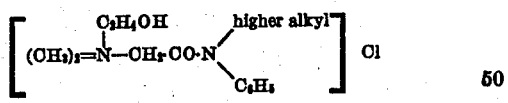

higher alkyl meaning the high molecular alkyl radicals derived from the alcohols of hydrogenated spermaceti, comprising mainly alkyl radicals from $C_{16}$ to $C_{18}$.

FRITZ BECHERER.
MARTIN ISELIN.
JAKOB BINDLER.